United States Patent
Nandakumar et al.

(10) Patent No.: US 11,178,202 B2
(45) Date of Patent: Nov. 16, 2021

(54) CLOCK COMPENSATION FOR STREAMING MEDIA SYSTEMS

(71) Applicant: Apple Inc., Cupertino, CA (US)

(72) Inventors: Prashant Nandakumar, Cupertino, CA (US); Zhenheng Li, San Jose, CA (US); Roger N. Pantos, Scotts Valley, CA (US); Gregory R. Chapman, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/819,816

(22) Filed: Mar. 16, 2020

(65) Prior Publication Data

US 2021/0289017 A1    Sep. 16, 2021

(51) Int. Cl.
*H04L 29/06* (2006.01)
*H04L 12/26* (2006.01)
*H04L 29/08* (2006.01)

(52) U.S. Cl.
CPC .......... *H04L 65/604* (2013.01); *H04L 43/106* (2013.01); *H04L 65/4069* (2013.01); *H04L 67/02* (2013.01)

(58) Field of Classification Search
None
See application file for complete search history.

(56) References Cited

U.S. PATENT DOCUMENTS 10,547,915 B1 * 1/2020 Valliere ................. H04L 65/607
2006/0013263 A1    1/2006 Fellman (Continued)

FOREIGN PATENT DOCUMENTS

WO    WO-2014043405 A1 *  3/2014  ....... H04N 21/43615
WO    WO-2014107580 A1 *  7/2014  ......... H04N 21/4305

OTHER PUBLICATIONS

Series G: Transmission Systems and Media, Digital Systems and Networks, Packet over Transport aspects—Synchronization, quality and availability targets; Series Y: Global Information Infrastructure, Internet Protocol Aspects and Next-Generation Networks, Internet of Things and Smart Cities, Internet protocol aspects—Transport; Timing and synchronization aspects in packet networks, ITU-T G.8261/Y.1361 Corrigendum 1, Apr. 2016, 8 pages.

(Continued)

*Primary Examiner* — Jeffrey R Swearingen
(74) *Attorney, Agent, or Firm* — Womble Bond Dickinson (US) LLP (57) ABSTRACT

In one embodiment, systems, methods and non-transitory machine readable media detect differences between the rate of production, by a server, of media segments identified in an HTTP compliant playlist and the rate of consumption, by a client device, of the media segments in streaming media content. These differences, once detected, can be used to adjust a playback rate at the client to reduce the difference between the server rate and the client rate. This detection can be used in low latency streaming media contexts in which the client device is playing back content that is live, such as a live sports event happening during the playback by the client device. The adjustment of the client's playback rate can avoid running out of buffered media segments (when the client's rate is much faster than the server's rate) and can avoid increasing latency at the client device and overloading a buffer with too many media segments (when the client's rate is much slower than the server's rate).

21 Claims, 7 Drawing Sheets

(56) References Cited

U.S. PATENT DOCUMENTS

| | | |
|---|---|---|
| 2006/0104397 A1 | 5/2006 | Lottis et al. |
| 2008/0212619 A1 | 9/2008 | Scott et al. |
| 2014/0068693 A1* | 3/2014 | Hierro ............... H04N 21/6373 |
| | | 725/116 |
| 2017/0171577 A1* | 6/2017 | Kipp ............... H04N 21/26258 |
| 2017/0181113 A1* | 6/2017 | Keyser-Allen ..... H04N 21/4307 |
| 2020/0137434 A1* | 4/2020 | Amidei ............... H04L 65/607 |

OTHER PUBLICATIONS

Kyeong Soo Kim, "Asynchronous Source Clock Frequency Recovery through Aperiodic Packet Streams", Aug. 18, 2013, 4 pages.
K.S. Kim and B.G. Lee, "KALP: A Kalman filter-based adaptive clock method with prefiltering for packet networks use", IEEE Trans. Common, vol. 48, No. 7, pp. 1217-1225, Jul. 2000.
J. Aweya, D. Y. Montuno, M. Ouellette, and K. Felske, "Clock recovery based on packet inter-arrival time averaging," Comp. Commun., vol. 29, No. 10, pp. 1696-1709, Jun. 2006.

\* cited by examiner

TAD = Total Available Duration = Sum of durations in rolled off playlists (303) + Sum of durations in current playlist (305) − playback time at client (307)

301

$TAD_1 = 4 + 1 - T_1$ $TAD_2 = 5 + 1 - T_2$ if $T_2 - T_1 = 1$ sec then
    $TAD_2 - TAD_1 = 0$

CLOCK COMPENSATION FOR STREAMING MEDIA SYSTEMS

BACKGROUND

Many devices presently use streaming media content delivery systems to present content such as movies, television shows, recorded sports events, news programs, live events such as live sports events, live news events, etc. These streaming media content delivery systems typically use one or more playlists that enumerate an ordered series of uniform resource identifiers (URIs), such as uniform resource locators (URLs), to identify media segments that can be retrieved from one or more servers using conventional HTTP compliant requests. Once retrieved, the media segments can be presented on the client device that requested the media segments and then erased on the client device after the presentation of each of the media segments. These streaming media content delivery systems can display both recorded content, such as a movie or video on demand content or live content such as a live sports event or live news event that is happening at the same time that the user of a client device is watching the live sports event or live news event.

These existing systems can have difficulty delivering content for live events in a manner that has low latency relative to the live event. For example, for a live sports event that is happening while a user is viewing the live sports event using a streaming media system, an action that happened in the live event might not be displayed by the streaming media system until many seconds (e.g., 15 seconds or more) after the live event occurred (in real time). Many users may find this large latency disappointing, and thus there is a need to improve the latency of delivery in streaming media systems. Improving this latency by reducing it can lead to problems when the clocks used at the server systems, which produce the media segments and the playlists containing identifiers (e.g., URLs) for the media segments, do not match the clocks used at client devices that receive and present the media segments that contain the content. This disclosure provides various solutions to solve this need.

SUMMARY OF THE DESCRIPTION

According to one aspect, a client system can detect differences between (1) the rate of production, by a server system, of media segments identified in an HTTP compliant playlist and (2) the rate of consumption, by the client system, of those media segments in streaming media content. The rate of production can be referred to as a server rate and the rate of consumption can be referred to as a client rate. These differences, once detected, can be used to adjust a playback rate at the client system to reduce the difference between the server rate and the client rate. This detection can be used in low latency streaming media contexts in which the client system is playing back content that is live, such as a live sports event happening during the playback by the client system. The adjustment of the client's playback rate can avoid running out of buffered media segments at the client device (when the client's rate is much faster than the server's rate) and can avoid increasing latency at the client device and overloading a client's buffer with too many media segments (when the client's rate is much slower than the server's rate).

According to one aspect, a method described herein can include the following operations: determining a set of one or more differences between a server rate and a client rate, wherein the server rate represents a rate at which a server device, such as one or more server systems, is producing media segments identified in a set of one or more playlists used to present streaming media content at a client device, and the client rate represents a rate at which the client device is consuming the produced media segments; and adjusting, at the client device, the client rate based on the set of one or more differences, the client rate adjusted to reduce future differences between the server rate and the client rate, and the adjusted client rate changing the playback of the streaming media content at the client device. According to one aspect, the client device can determine the set of one or more differences using (1) a first set of timestamps applied by the server device to one or more media segments identified in the set of one or more playlists, the client device receiving the first set of timestamps in the set of one or more playlists when the set of one or more playlists are received; and (2) a second set of timestamps applied by the client device to the set of one or more playlists. In one implementation, the client device can apply a timestamp that indicates the time of receipt of the playlist when the playlist is received by the client device, and the timestamp can be obtained from a real-time clock on the client device. The server device can use a real-time server clock to apply the first set of timestamps to the one or more media segments. In one implementation, if the client rate is slower than the server rate, the client rate of playback of the streaming media content at the client device is adjusted by increasing a client rate to attempt to converge the client rate to the server rate; and if the client rate is faster than the server rate, the client rate is adjusted by decreasing the client rate to attempt to converge the client rate to the server rate.

According to one aspect, the client device can request and receive the set of one or more playlists in a hypertext transfer protocol (HTTP) compliant manner, and the set of one or more playlists can be a plurality of playlists, each of which includes a plurality of uniform resource identifiers (URIs) that identify media segments that can be retrieved by the client device using the URIs in the HTTP compliant manner, and the plurality of URIs can indicate an order of playback of the identified media segments to present the streaming media content at the client device. According to one aspect, each playlist in the set of playlists can be an update playlist that contains URIs for only the most recent media segments in the streaming media content (e.g., a playlist delta update). According to one aspect, the update playlist can include a skip indicator that specifies a skip boundary used in the update playlist. According to one aspect, each playlist in the set of playlists can contain a server timestamp associated with a URI for a media segment, such as the last media segment in the update playlist, and the server timestamp can indicate the start time of the content in the last media segment in the update playlist. The server device can apply the server timestamp to the URI for that media segment before the playlist is completed by the server device.

According to one aspect, the client device can perform a regression analysis on a set of pairs of timestamps, where a pair in the set of pairs can be formed by (1) a first timestamp from the first set of timestamps, the first timestamp contained in a first update playlist in the set of one or more playlists, and (2) a second timestamp from the second set of timestamps, the second timestamp associated with the first update playlist by the client device. The regression analysis can attempt to derive a slope of a curve or line fitted to the set of pairs of timestamps, and the slope can represent the difference between the server rate and the client rate.

According to one aspect, the client device can determine whether the regression analysis has converged to a solution for the difference between the server rate and the client rate, and the client device can adjust the client rate in response to determining that the regression analysis has converged to the solution. According to one implementation, the client device will not adjust the client rate when the regression analysis has not converged to a solution, and thus the convergence to a solution can be a prerequisite to adjustment of the client rate.

According to another aspect, the client device can determine the set of one or more differences by using data about durations of the media segments across multiple playlists. According to this aspect, the client device can determine the set of one or more differences by: determining a first available duration time from duration data in a first playlist; determining a second available duration time from duration data in a second playlist; calculating a first difference between the first and the second available duration times to derive a measure of the difference between the server rate and the client rate. According to one implementation, the first available duration time and the second available duration time can each include the sum of the durations of the media segments in all of the playlists which have rolled off of the current playlist and can also include the duration of the media segments in the current playlist at the client device (or other combinations of the durations of the media segments).

According to one aspect, the methods and systems described herein can be used in low latency HTTP Live Streaming (HLS) protocols that use low latency extensions to HLS protocols such as the existing HLS protocol documented in RFC 8216 and draft-pantos-hls-rfc8216bis. These low latency extensions can include the use of blocking requests, and the use of update playlists, and preload hints as well as other aspects of these low latency extensions.

The aspects and embodiments described herein can include non-transitory machine readable media that store executable computer program instructions that can cause one or more data processing systems (such as client devices and one or more server systems) to perform the one or more methods described herein when the computer program instructions are executed by the one or more data processing systems. The instructions can be stored in non-transitory machine readable media including, for example, nonvolatile memory such as flash memory or volatile memory such as dynamic random access memory or other forms of memory.

The above summary does not include an exhaustive list of all embodiments in this disclosure. All systems and methods can be practiced from all suitable combinations of the various aspects and embodiments summarized above and also those disclosed in the Detailed Description below.

BRIEF DESCRIPTION OF THE DRAWINGS

The aspects described herein are illustrated by way of example and not by limitation, in the figures of the accompanying drawings in which like reference numerals refer to similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one aspect" or "one embodiment" or "an embodiment" or "an aspect" means that a particular feature, structure, or characteristic described in conjunction with the aspect or embodiment can be included in at least one aspect or one embodiment. The appearances of the phrase "in one embodiment" or "in one aspect" in various places in the specification do not necessarily all refer to the same embodiment or same aspect. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
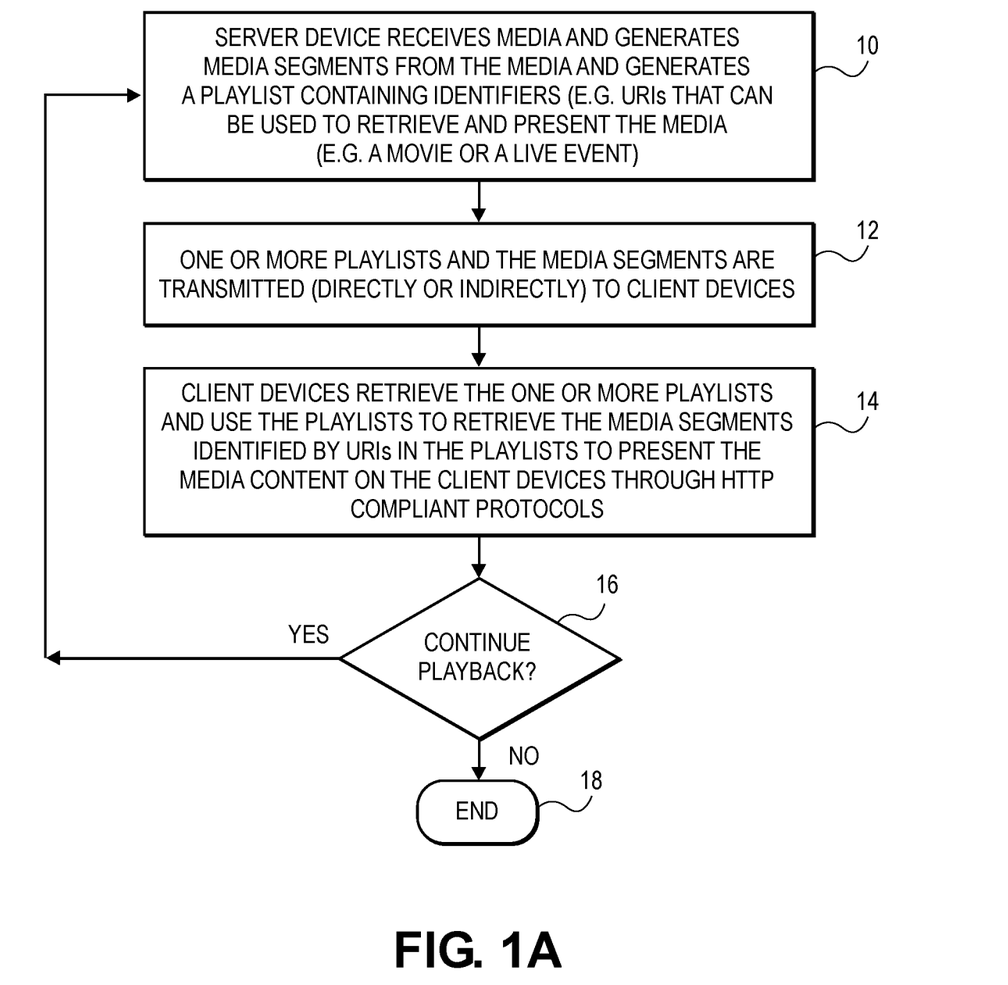
FIG. 1A is a flowchart which illustrates a method that can use playlists with an HTTP compliant protocol to present streaming media on a client device.

The aspects and embodiments described in this disclosure can be used in the context of systems that provide streaming media through the use of playlists that are created by server systems and distributed to client systems which use the uniform resource identifiers (URI) in the playlists to retrieve media segments in order to present (e. g., display or play audio or both) the streaming media on the client systems. FIG. 1A shows an example of a method that can be used in this context. In operation 10, a server device can receive media, such as a live sports event, and can generate media segments from the media and can also generate a playlist containing identifiers, such as URIs, that can be used to retrieve and present the media such as a movie or the live sports event. In operation 12, the one or more playlists and the media segments can then be transmitted, either directly or indirectly through caching server systems, to client devices. In operation 14, the client devices can retrieve the one or more playlists and use the playlists to retrieve the media segments identified by the URIs in the playlists to present the media content on the client devices through, in one implementation, HTTP compliant protocols. The client devices, in operation 16, will loopback to operation 10 to continue the method when playback is continued or will end playback in operation 18 if playback is to be terminated (for example, at user request or the content of the program ends, etc.). In one implementation or aspect, the method shown in FIG. 1A can use HLS protocols such as the existing HTTP Live Streaming (HLS) or the method shown in FIG. 1A can be based on the DASH (Dynamic Adaptive Streaming over HTTP) systems that are based on a standard (such as ISO/IEC23009-1:2014).

Figure 1B:
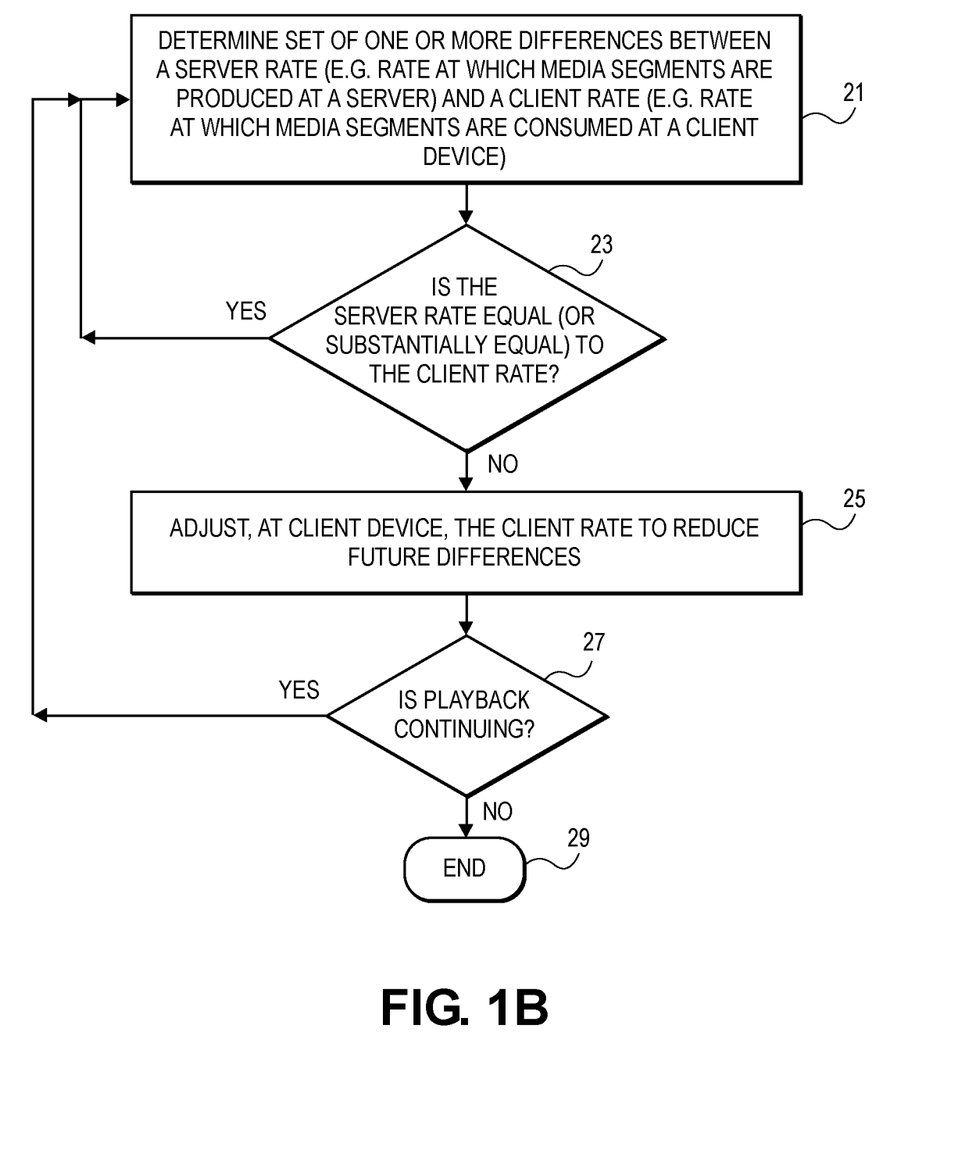
FIG. 1B shows a flowchart which illustrates a method according to one aspect for adjusting a client rate to approximate a server rate in a streaming media system which can use playlists with an HTTP compliant protocol to present streaming media on a client device.

FIG. 1B shows an example of a method according to one aspect or embodiment described herein. In operation 21, a client device can determine a set of one or more differences between a server rate and a client rate. The server rate can be, for example, the rate at which media segments are produced at a server system which can include one or more server devices operating together. The client rate can be the rate at which media segments are consumed at a client device. The consumption of media segments may be measured by the times when the media segments are received or the times when the media segments are presented. In the example shown in FIG. 1B, the operations performed in operation 21 can be performed on a client device based upon timestamps, which are described further below, or based upon other techniques such as calculations, which are described further below, relating to durations of media segments in a current playlist as well as prior playlists. In operation 23, the client device can determine whether the server rate is equal (or substantially equal) to the client rate. The client device can use a threshold value to determine whether the client rate is substantially equal to the server rate. If the difference between the client rate and the server rate is greater than the threshold value, then the client device determines that the server rate is not equal to the client rate. If the server rate is equal or substantially equal to the client rate then processing loops back to operation 21 from operation 23. On the other hand, if operation 23 determines that the server rate is not equal to (or not substantially equal to) the client rate then the client device, in operation 25, adjusts the client rate to attempt to match the client rate to the perceived or observed server rate in order to reduce future differences between the client rate and the server rate. If playback is continuing, as determined in operation 27, then processing loops back to operation 21, and otherwise processing or playback can end in operation 29. The method shown in FIG. 1B can be used as part of the method shown in FIG. 1A in the context of systems that provide streaming media by using playlists that identify media segments in the streaming media. Moreover, the method shown in FIG. 1B can be used in low latency extensions of such systems that provide streaming media. For example, low latency extensions that use blocking requests or preload hints or update playlists (or any combination of such extensions) can be used with the method shown in FIG. 1B. Such low latency extensions are described in the following US patent applications: U.S. Provisional Application No. 62/946,862 filed Dec. 11, 2019; U.S. Provisional Application No. 62/810,075 filed Feb. 25, 2019; U.S. Provisional Application No. 62/843,887 filed May 6, 2019; and U.S. Provisional Application No. 62/873,664 filed Jul. 12, 2019.

Figure 2:
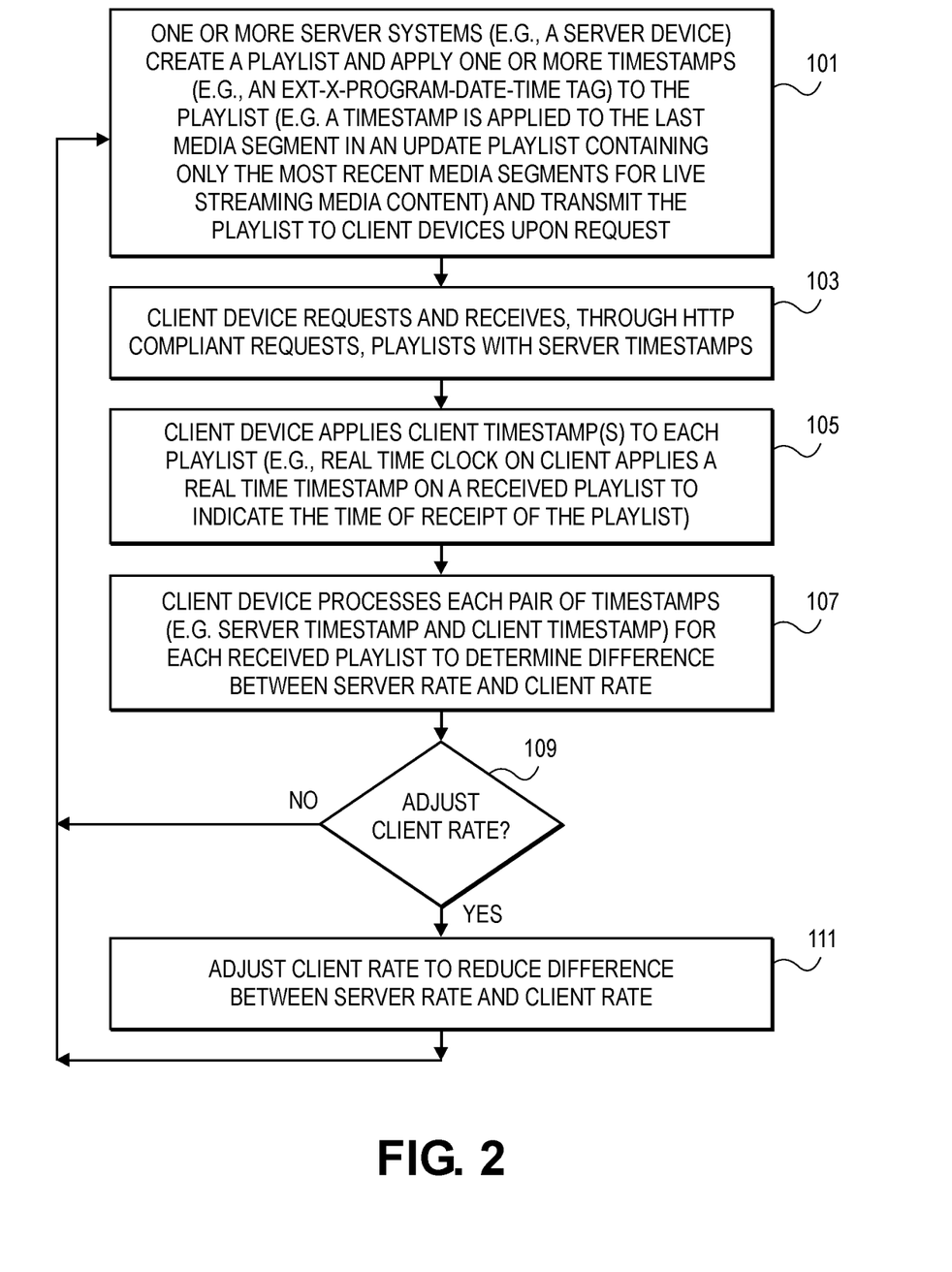
FIG. 2 shows a flowchart which illustrates a method according to one aspect for adjusting a client rate in a streaming media system which can use playlists as described herein.

The method shown in FIG. 1B can be used in streaming systems that use timestamps such as the HLS EXT-X-PROGRAM-DATE-TIME tag, and FIG. 2 shows an example of a method which can use such timestamps to determine one or more differences between a server rate and a client rate. As shown in FIG. 2, in operation 101 one or more server systems, such as a server device, create a playlist and apply one or more timestamps to the playlist. The playlist can then be transmitted, once completed, to client devices upon request. The timestamp can be applied, for example, to the last media segment in an update playlist containing only the most recent media segments for live streaming media content. How the server applies the timestamps can vary depending upon the implementation, but it may be desirable to consistently apply the timestamps in the same manner across different playlists for a particular streaming media. Thus, the server for a particular streaming content can apply its timestamp to the last media segment (e.g., to indicate the server clock's real time at the start of that last media segment) on a consistent basis for that particular streaming content but use a different (but consistent) approach for another streaming content. Similarly, the client device can use the same consistent approach to timestamp received playlists with the same particular streaming content. In one implementation, a server device can apply a single timestamp to only one media segment in the media content identified in the playlist, and this single timestamp can be used to derive times for other media segments based upon specified durations for intervening media segments. Another words, a single timestamp can be used to derive timestamps for other media segments based upon the durations of the media segments specified in the playlist. The server can use the real-time clock maintained at the server to derive the real time that is placed in the timestamp. In operation 103, the client device can request and receive, through HTTP compliant requests, the playlists with the server timestamps. Then in operation 105, the client device can provide or apply one or more client timestamps to each playlist. In one implementation, the client device can use a real time clock on the client device to apply a real-time timestamp on a received playlist to indicate the time of receipt of the playlist. In another implementation, the client device can use the real-time clock on the client device to apply a real-time timestamp to one or more media segments as the client device begins to present the one or more media segments. After operation 105, the client device can use the timestamps from the server and the timestamp or timestamps applied by the client device to determine, in operation 107, a difference between the client rate and the server rate. In one implementation, the client device may have a pair of timestamps for each update playlist, and this implementation provides a set of pairs for a plurality of update playlists; a specific example using such pairs for a plurality of update playlists is provided below in conjunction with FIGS. 3 and 4 which will be described further below. Once a difference between the server rate and the client rate is determined in operation 107, the client device can determine in operation 109 whether to adjust the client rate. If the client rate is substantially equal to the server rate, no adjustment will be made and processing reverts back to operation 101 as shown in FIG. 2; on the other hand, if the client rate is not substantially equal to the server rate then processing proceeds to operation 111. In operation 111, the client playback rate is adjusted to reduce the difference between the server rate and the client rate. The adjustment of the client playback rate can be based upon and proportional to the difference between the server rate and the client rate. If the server rate is faster than the client rate, then the client rate is increased to attempt to match or converge the client rate to the server rate; if the server rate is slower than the client rate, then the client rate is decreased to attempt to match or converge the client rate to the server rate. The adjustment may be incremental such that the adjustment may not fully compensate for the difference between the rates, and this incremental approach may reduce overshooting the adjustment. The adjustment of the client playback rate can be made using techniques known in the art for adjusting the client playback rate. After the client rate is adjusted in operation 111, processing reverts back to operation 101 as long as playback continues in one implementation. Thus, the client device can continue to monitor the difference between the server rate and the client rate and make appropriate adjustments based on the difference as the client device consumes the media content. The method shown in FIG. 2 may be used in the context of low latency streaming media content, such as streaming media systems that use the low latency extensions to HLS described in the following provisional patent applications: U.S. Provisional Application No. 62/946,862 filed Dec. 11, 2019; U.S. Provisional Application No. 62/810,075 filed Feb. 25, 2019; U.S. Provisional Application No. 62/843,887 filed May 6, 2019; and U.S. Provisional Application No. 62/873,664 filed Jul. 12, 2019.

The methods shown in FIG. 1B and FIG. 2 can use the content of the playlist itself to measure the difference between the server rate and the client rate rather than using the media segments themselves to make this measurement. Thus, these methods can be performed using smaller data files (e.g., the playlist files) rather than the larger data files that contain the media segments. Moreover, prior approaches used the change in the amount of data in the client device's buffer to detect the difference in rates between the server and the client, and the methods and systems described herein can avoid using changes in the amount of data stored in a client device's buffer which stores the media segments to be played at the client device.

Figure 3:
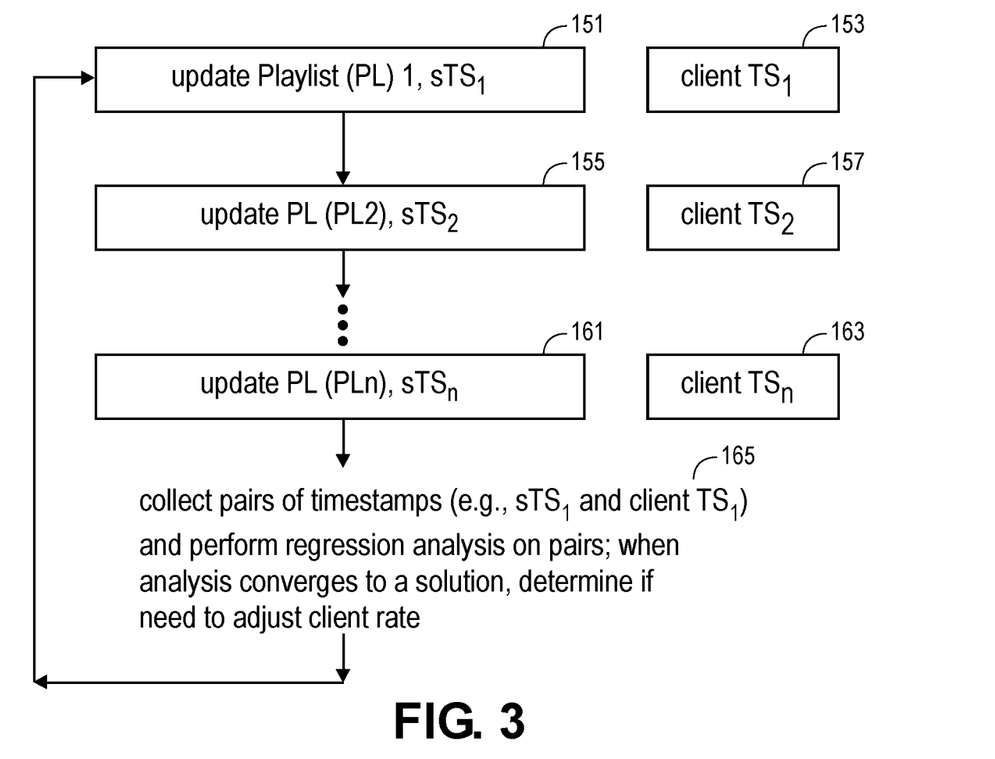
FIG. 3 shows a method according to an aspect which can use update playlists and pairs of timestamps to detect differences between a server rate and a client rate during the presentation of streaming media using the update playlists.

FIG. 3 shows an example of how a client device can generate a set of pairs of timestamps, where each pair of timestamps can be for a particular update playlist in a sequence of update playlists that are received by the client device over time. Each of the update playlists can be requested by the client device with a blocking playlist reload request which causes a server system to block the response to the request for the updated playlist until the update playlist is completed (see U.S. Provisional Application No. 62/810,075, filed Feb. 25, 2019). The blocking playlist reload request (or a separate associated request) can include a future media segment specified by the client device which made the blocking request, and the prior playlist at the client device may have included a preload hint, such as a preload hint described in U.S. provisional application No. 62/946, 862 filed Dec. 11, 2019. Each update playlist may contain only the most recent media segments in the streaming content, and each update playlist may include a skip indicator as described in U.S. provisional application No. 62/843,887 filed May 6, 2019. The blocking playlist reload request can help to reduce or eliminate jitter in the process of discovering the most recent media segment that is available because the client device can be notified (as a result of a blocking playlist reload request) of a segment (or partial segment) that is available and near the current live edge for playback of live content. The blocking playlist reload request can include, either in the blocking request for an updated playlist or a concurrent related request for an updated playlist, a request for the segment (or partial segment) that is near the current live edge for playback of live content. The blocking playlist reload request can request an update playlist request for an updated playlist that contains only the most recent media segments that are near the current live edge, and these update playlists can be small enough that they can be contained in a single MTU (Maximum Transmission Unit) so there can be only one single route and no packet reordering delays, etc., and thus these update playlists suffer less network jitter than other data (such as media segments or complete media playlists). When a server device receives the blocking playlist reload request, it will block a response to the request until the next update playlist is available (for example, the next update playlist is still being prepared by an origin server) but once the next update playlist becomes available (e.g., it has been received from the origin server) then the server device can transmit the next update playlist. The server device (or another server device) can also transmit the next media segment that was requested by the client device when the client device requested the next update playlist.

In the example shown in FIG. 3, the client device applies a real-time timestamp to each update playlist when it is received by the client device. Thus, as shown in FIG. 3, update playlist 151 is time stamped by the client device with a client timestamp 153 (cTS1) which indicates the time of receipt, in real time ("wall clock"), of the update playlist 151 by the client device. The update playlist 151 includes a server timestamp (sTS1) that the server applied to, for example, a particular media segment such as the last media segment identified in the update playlist 151. The client device processes each of the received update playlists, including update playlists 155 and 161 in a similar fashion. Thus, for example, the client device will apply a client timestamp 157 (cTS2) to the update playlist 155 which includes a server timestamp (sTS2), and the client device will apply a client timestamp 163 (cTSn) to the update playlist 161 which includes a server timestamp (sTSn). Hence, each update playlist includes a pair of time stamps associated with the update playlist, and this pair of timestamps allows the client to perform a regression analysis on the pairs to determine a slope of a line or curve represented by the sequence of pairs over time. When this regression analysis converges to a solution, the solution can be used to determine the difference between the server rate and the client rate. This is shown as operation 165 which can be similar to operation 107 shown in FIG. 2. Each time the client device receives an update playlist, such as update playlist 151, it can perform the normal operations that use the playlist to request and receive media segments and present the media segments on the client device. In other words, the client device can use the playlists in the manner shown in FIG. 1A to present the media content on the client device, such as to show a live TV show or a live sports events or other media, including audio only or other content that can produce an output at the client device.

Figure 4:
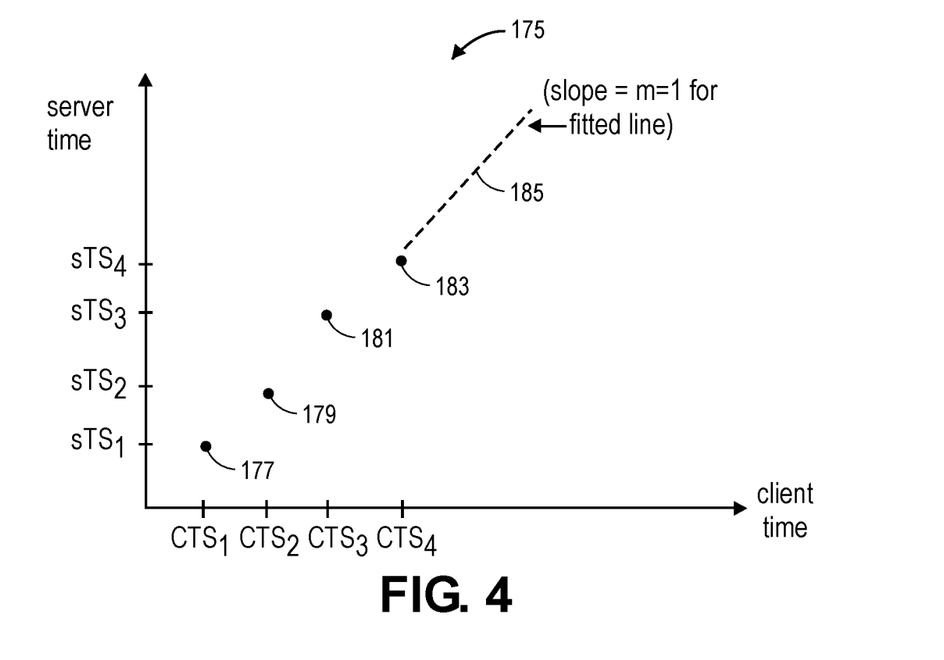
FIG. 4 shows a graph created from pairs of timestamps according to one aspect.

FIG. 4 shows a graph 175 that shows how the pairs of timestamps over time can be used in a regression analysis to derive a slope for a curve or line from the pairs which in turn can be used to determine the difference between the server rate and the client rate. In the example shown in FIG. 4, four pairs of timestamps are shown on the graph 175. Each pair is used to create a point on the graph 175 based upon the timestamp values from the server and the client; in the example shown in FIG. 4, the timestamp from the server is assigned to the Y axis and the timestamp from the client device is assigned to the X axis. For example, the pair 177 represents the pair of timestamps associated with the update playlist 151 in FIG. 3. The pair of timestamps 179 represent the pair of timestamps associated with the update playlist 155 in FIG. 3. The pair of timestamps 181 represents a pair of timestamps associated with the third update playlist that follows the second playlist, and the pair of timestamps 183 represents the pair of timestamps associated with the fourth update playlist (that follows the third playlist) in the sequence over time of the update playlists. Each pair can be used to represent a point in the graph 175 as shown in FIG. 4. For example, the pair 177 (timestamps sTS1 from playlist 151 and cTS1 in FIG. 3) is mapped onto the graph 175 at the point shown on graph 175 by the pair 177 at the coordinates based on the server time (on the Y axis) and the client time (on the X axis). The plot of these pairs over time can produce data which can be recognized by a regression analysis as a line (or curve) based on fitting the points to the line (or curve) using regression analysis that is known in the art. It will be appreciated that there will be noise due to network jitter and thus the plot of points may not exactly resemble a line but still can be fitted to a line based on the regression analysis. The client device can perform the regression analysis over time using the data from the pairs of timestamps, and when a regression analysis converges to a solution, the client device can determine that it is now appropriate to adjust the client rate. If there is no convergence to a solution from the regression analysis, the client device can continue to collect pairs of timestamps in order to attempt to obtain a converged solution to the regression analysis. In one implementation, no adjustment of the client rate occurs unless there is a converged solution; in other words, the adjustment of the client rate is only made if there is a converged solution in one implementation. In the example shown in FIG. 4, the fitted line 185 has a slope of one (m=1), which indicates that the client rate matches or is equal to the server rate in this example. It will be appreciated that the line 185 can extend through the entire graph but is shown in FIG. 4 as extending through only a portion of the graph in order to simplify the graph. A client device can continue to collect these pairs over a sequence of time and determine a converged solution and adjust a client rate and continue to repeat this process (e.g., collect and process to achieve a converged solution and then adjust the client rate and then collect and process and adjust based on a new convergent solution) while the client device continues to receive the streaming media content. In one implementation, this use of timestamps can be limited to streaming media that is received using low latency extensions or is live content, and this use of timestamps is not employed when the client device is not using low latency extensions or when the content is not live. The converged solution from the regression analysis can represent the difference between the server rate and client rate, and this difference can be used to adjust the client rate based upon the detected difference.

Figure 5A:
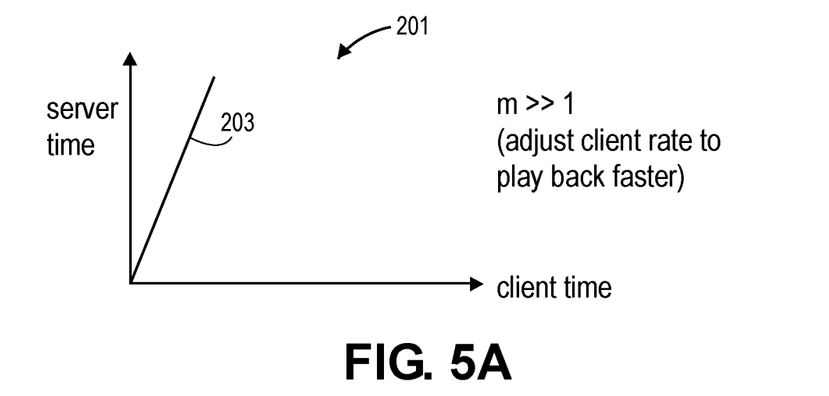
FIGS. 5A, 5B, and 5C show graphs which can be created from the pairs of timestamps according to one aspect, where these graphs can be used to indicate the differences between the client rate and the server rate.
Figure 5B:
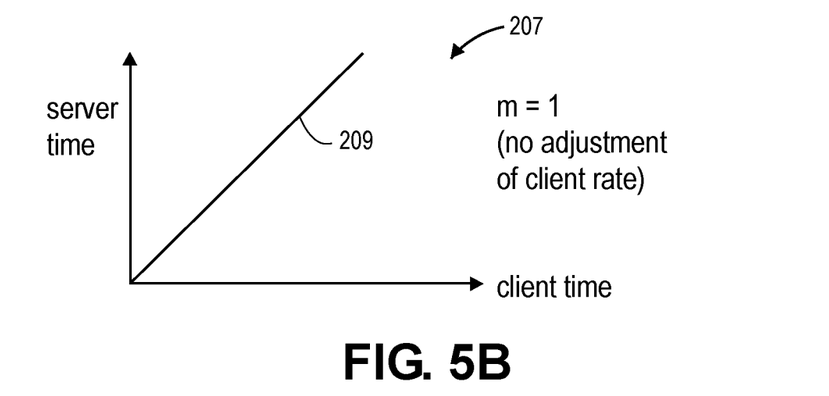
Figure 5C:
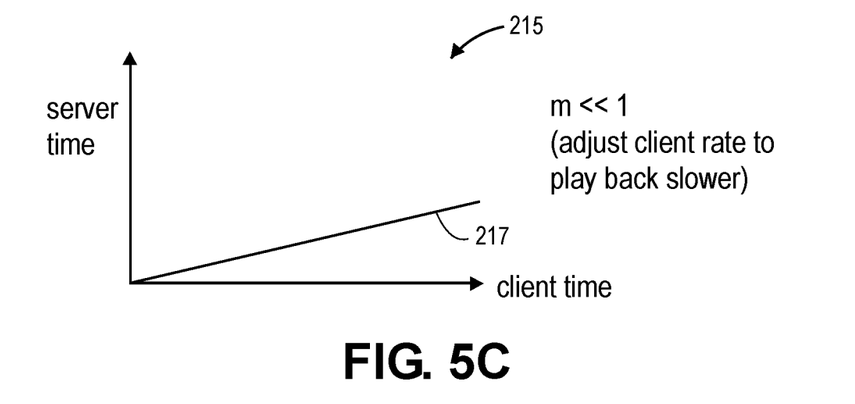

FIGS. 5A, 5B, and 5C show three different examples of fitted lines from regression analysis results that show three different situations between the server rate and the client rate. In FIG. 5B, the graph 207 shows a fitted line 209 from the regression analysis, and this fitted line indicates that the server rate matches (e.g., is substantially equal to) the client rate as the slope of the fitted line is equal to 1 (or is substantially equal to 1). In FIG. 5A, the graph 201 shows a fitted line 203 from the regression analysis, and this fitted line indicates that the server rate is faster than (e.g., is greater than) the client rate as the slope of the fitted line is greater than 1. In FIG. 5C, the graph 215 shows a fitted line 217 from the regression analysis, and this fitted line indicates that the server rate is slower than (e.g., is less than) the client rate as the slope of the fitted line is less than 1. In the case of the regression result shown in FIG. 5A, the client device can increase the client device's playback rate in order to attempt to match the observed server rate, and in the case of the regression result shown in FIG. 5C, the client device can decrease the client device's playback rate in order to attempt to match the observed server rate.

Figure 6:
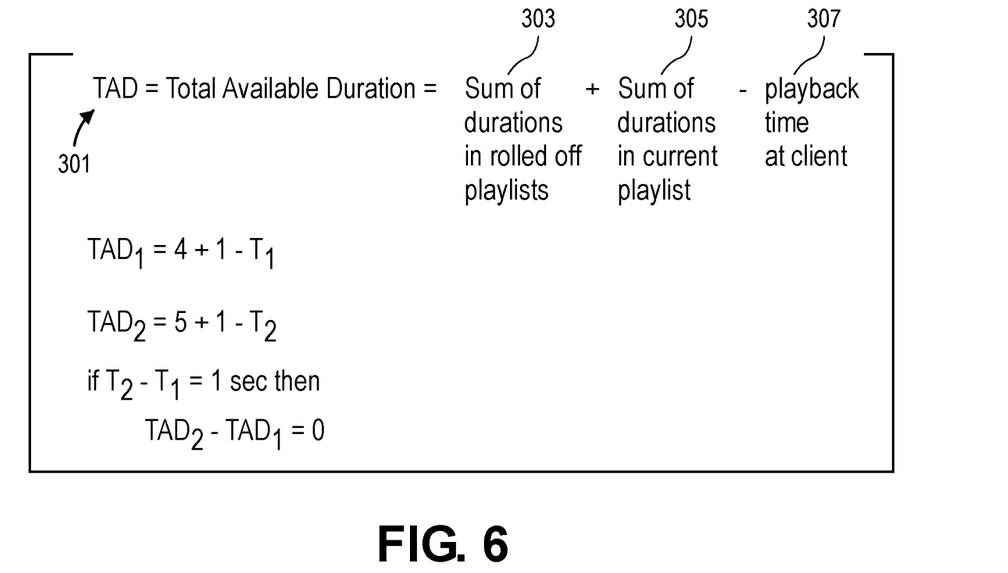
FIG. 6 shows an example of an alternative aspect which can use a total available duration that can be measured for each playlist received by the client device in order to detect differences between the server rate and the client rate.
Figure 7:
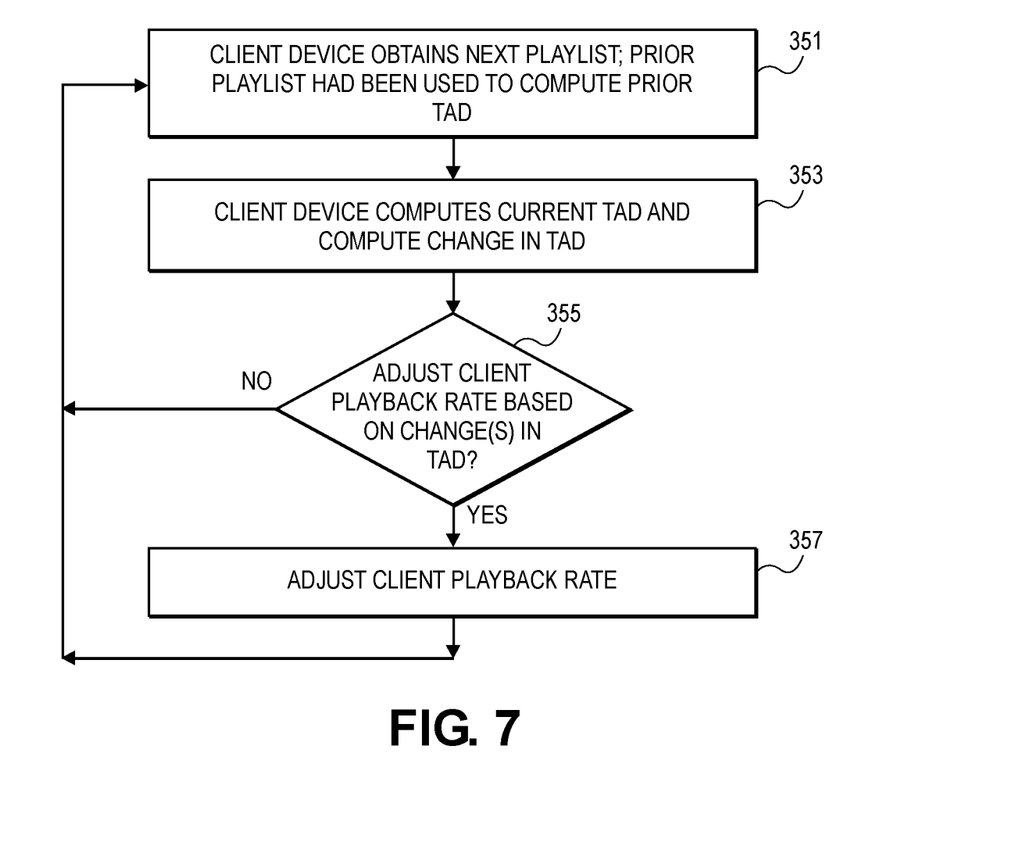
FIG. 7 shows a flowchart which illustrates a method which can use the total available duration approach to determine differences between a server rate and a client rate.

FIGS. 6 and 7 show an alternative approach for determining one or more differences between server and client rates using duration data in the playlists. This alternative approach can be used in some aspects and embodiments described herein and can be used instead of using timestamps (as in the examples shown in FIGS. 2-4). This alternative approach can be used with the method shown in FIG. 1A and can use the low latency extensions described or referred to herein. In the example shown in FIG. 6, the alternative approach can use a value defined as a Total Available Duration (TAD) 310 that can be based on (1) the sum of the durations of media segments in playlists that have rolled off (and are not provided to client devices that are near the live edge of the content) shown as sum 303 in FIG. 6 plus (2) the sum of the durations of media segments in the current playlist being processed at the client device (shown as sum 305 shown in FIG. 6) minus (3) the current playback position 307 within the current playlist. This TAD value can represent the total duration in time of all of the media segments behind the current play head of the client device at the current time, and the change in TAD can be used to measure clock drift between the server rate and the client rate, and this difference between the server and client rates can be used to calculate an adjustment to the client rate in order to reduce the future difference in rates between the server and client devices. If there is no difference between consecutive TAD values, then the server and client rates appear to be matched and this is shown in FIG. 6 (TAD2− TAD1=0). In this case, no adjustment would be made to the client rate and the process can be repeated over time with each new playlist (e.g., each new update playlist that contains only the most recent media segments and can include a skip tag and use other low latency extensions referred to herein). A method for using changes in TAD over time to adjust the client rate is shown in FIG. 7. In operation 351, the client device can obtain the next playlist and in operation 353 compute the current TAD and use the prior playlist to compute the prior TAD. The difference between the consecutive TADs (or a set of consecutive TADs over time) can be averaged over time, and that averaged difference can be used as a measure of the difference between the server rate and the client. In one implementation, a set of two or more TADs (e.g. five consecutive TADs) can be used to perform a regression analysis to calculate the drift between the server rate and the client rate. This regression analysis can be similar to the regression analysis described herein relative to FIG. 4; in this implementation that uses regression analysis for two or more TADs, the regression analysis can, in effect, attempt to determine the slope of a fitted line of a plot of TADs on a graph of TADs with TAD values on the y-axis and client times (for calculated TAD values) on the x-axis. A positive slope, in this example, indicates that the TAD value is increasing over time and thus the client is consuming content slower than the server's production rate (client rate is slower than the server's rate); a negative slope, in this example, indicates that the TAD value is decreasing over time and thus the client rate is faster than the server's rate. Based on that difference (or regression analysis), the client device in operation 355 can determine whether to adjust the client rate and then adjust the client rate in operation 357. Processing can then revert back to operation 351 to continue the process of monitoring the difference between the server and client rates over time. It will be appreciated that alternative methods for computing durations from a sequence of playlists can be used in alternative approaches of the method shown in FIG. 7.

Figure 8:
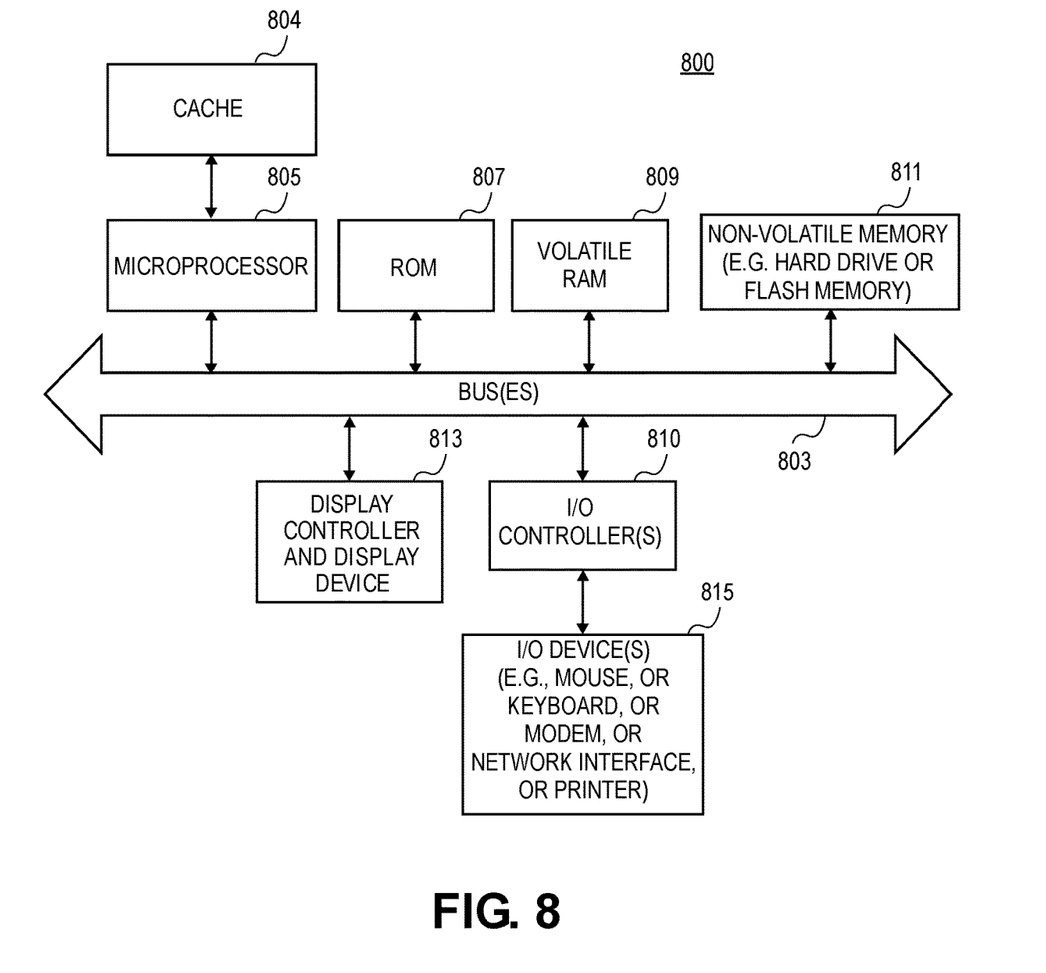
FIG. 8 shows a block diagram of a data processing system which can be used to implement one or more of the aspects and embodiments described herein; for example, the data processing system shown in FIG. 8 can be used implement a client device that operates as described herein or a server system described herein that applies timestamps to one or more playlists to allow a client device to detect the difference between a server rate and a client rate.

FIG. 8 shows one example of a data processing system 800, which may be used with one embodiment. For example, the system 800 may be implemented to provide a client system or device that performs the method of FIG. 1B or 2. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
    determining a set of one or more differences between a server rate and a client rate, wherein the server rate represents a rate at which a server device is producing media segments identified in a set of one or more playlists used to present streaming media content at a client device, and the client rate represents a rate at which the client device is consuming the produced media segments; and
    adjusting, at the client device, the client rate based on the set of one or more differences, the client rate adjusted to reduce future differences between the server rate and the client rate, and the adjusted client rate changing the playback of the streaming media content at the client device.

2. The medium as claim 1 wherein the client device determines the set of one or more differences using (1) a first set of timestamps applied by the server device to one or more media segments identified in the set of one or more playlists, the client device receiving the first set of timestamps in the set of one or more playlists when the set of one or more playlists are received; and (2) a second set of timestamps applied by the client device to the set of one or more playlists.

3. The medium as in claim 2 wherein the server device uses a server real time clock to apply the first set of timestamps to the one or more media segments and the client device uses a client real time clock to apply the second set of timestamps to the set of one or more playlists.

4. The medium as in claim 3 wherein if the client rate is slower than the server rate, the client rate of playback of the streaming media content at the client device is adjusted by increasing the client rate to attempt to converge the client rate to the server rate; and wherein if client rate is faster than the server rate, the client rate is adjusted by decreasing the client rate to attempt to converge the client rate to the server rate.

5. The medium as in claim 3 wherein the client device requests and receives the set of one or more playlists in a hypertext transfer protocol (HTTP) compliant manner, and wherein the set of one or more playlists is a plurality of playlists, each of which includes a plurality of uniform resource identifiers (URIs) that identify media segments that can be retrieved by the client device using the URIs in the HTTP compliant manner and the plurality of URIs indicating an order of playback of the identified media segments to present the streaming media content at the client device.

6. The medium as in claim 5 wherein each playlist in the set of one or more playlists is an update playlist that contains URIs for only the most recent media segments in the streaming media content.

7. The medium as in claim 6 wherein each playlist in the set of one or more playlists contains a server timestamp associated with a URI for a media segment, the server timestamp applied by the server device before the playlist is completed by the server device, and wherein each playlist in the set of one or more playlists is timestamped at the time of receipt by the client device.

8. The medium as in claim 6, wherein the method further comprises:
    performing, at the client device, a regression analysis on a set of pairs of timestamps, a pair in the set of pairs formed by (1) a first timestamp from the first set of timestamps, the first timestamp contained in a first update playlist in the set of one or more playlists, and (2) a second timestamp from the second set of timestamps, the second timestamp associated with the first update playlist by the client device; and wherein the regression analysis attempts to derive a slope of a curve or line fitted to the set of pairs of timestamps and wherein the slope represents the difference between the server rate and the client rate.

9. The medium as in claim 8, wherein the method further comprises:
    determining, at the client device, whether the regression analysis has converged to a solution for the difference between the server rate and the client rate; and wherein the adjusting of the client rate is performed in response to determining that the regression analysis has converged to the solution.

10. The medium as in claim 1, wherein the method further comprises:
    performing, at the client device, a regression analysis on a set of pairs of timestamps, a pair in the set of pairs formed by (1) a first timestamp from the first set of timestamps, the first timestamp contained in a first update playlist in the set of one or more playlists, and (2) a second timestamp from the second set of timestamps, the second timestamp associated with the first update playlist by the client device; and wherein the regression analysis attempts to derive a slope of a curve or line fitted to the set of pairs of timestamps and wherein the slope represents the difference between the server rate and the client rate.

11. A non-transitory machine readable medium storing executable program instructions which when executed by a data processing system cause the data processing system to perform a method, the method comprising:
    determining a set of one or more differences between a server rate and a client rate, wherein the server rate represents a rate at which a server device is producing media segments identified in a set of one or more playlists used to present streaming media content at a client device, and the client rate represents a rate at which the client device is consuming the produced media segments; and adjusting, at the client device, the client rate based on the set of one or more differences, the client rate adjusted to reduce future differences between the server rate and the client rate, and the adjusted client rate changing the playback of the streaming media content at the client device; and wherein the client device determines the set of one or more differences by:

determining a first available duration time from duration data in a first playlist;

determining a second available duration time from duration data in a second playlist;

calculating a first difference between the first and the second available duration times to derive a measure of the difference between the server rate and the client rate.

12. A method comprising:

determining a set of one or more differences between a server rate and a client rate, wherein the server rate represents a rate at which a server device is producing media segments identified in a set of one or more playlists used to present streaming media content at a client device, and the client rate represents a rate at which the client device is consuming the produced media segments; and adjusting, at the client device, the client rate based on the set of one or more differences, the client rate adjusted to reduce future differences between the server rate and the client rate, and the adjusted client rate changing the playback of the streaming media content at the client device.

13. The method as claim 12 wherein the client device determines the set of one or more differences using (1) a first set of timestamps applied by the server device to one or more media segments identified in the set of one or more playlists, the client device receiving the first set of timestamps in the set of one or more playlists when the set of one or more playlists are received; and (2) a second set of timestamps applied by the client device to the set of one or more playlists.

14. The method as in claim 13 wherein the server device uses a server real time clock to apply the first set of timestamps to the one or more media segments and the client device uses a client real time clock to apply the second set of timestamps to the set of one or more playlists.

15. The method as in claim 14 wherein if the client rate is slower than the server rate, the client rate of playback of the streaming media content at the client device is adjusted by increasing the client rate to attempt to converge the client rate to the server rate; and wherein if the client rate is faster than the server rate, the client rate is adjusted by decreasing the client rate to attempt to converge the client rate to the server rate.

16. The method as in claim 14 wherein the client device requests and receives the set of one or more playlists in a hypertext transfer protocol (HTTP) complaint manner, and wherein the set of one or more playlists is a plurality of playlists, each of which includes a plurality of uniform resource identifiers (URIs) that identify media segments that can be retrieved by the client device using the URIs in the HTTP compliant manner and the plurality of URIs indicating an order of playback of the identified media segments to present the streaming media content at the client device.

17. The method as in claim 16 wherein each playlist in the set of one or more playlists is an update playlist that contains URIs for only the most recent media segments in the streaming media content.

18. The method as in claim 17 wherein each playlist in the set of one or more playlists contains a server timestamp associated with a URI for a media segment, the server timestamp applied by the server device before the playlist is completed by the server device, and wherein each playlist in the set of one or more playlists is timestamped at the time of receipt by the client device.

19. The method as in claim 17, wherein the method further comprises:

performing, at the client device, a regression analysis on a set of pairs of timestamps, a pair in the set of pairs formed by (1) a first timestamp from the first set of timestamps, the first timestamp contained in a first update playlist in the set of one or more playlists, and (2) a second timestamp from the second set of timestamps, the second timestamp associated with the first update playlist by the client device; and wherein the regression analysis attempts to derive a slope of a curve or line fitted to the set of pairs of timestamps and wherein the slope represents the difference between the server rate and the client rate.

20. The method as in claim 19, wherein the method further comprises:

determining, at the client device, whether the regression analysis has converged to a solution for the difference between the server rate and the client rate; and wherein the adjusting of the client rate is performed in response to determining that the regression analysis has converged to the solution.

21. A method comprising:

determining a set of one or more differences between a server rate and a client rate, wherein the server rate represents a rate at which a server device is producing media segments identified in a set of one or more playlists used to present streaming media content at a client device, and the client rate represents a rate at which the client device is consuming the produced media segments; and adjusting, at the client device, the client rate based on the set of one or more differences, the client rate adjusted to reduce future differences between the server rate and the client rate, and the adjusted client rate changing the playback of the streaming media content at the client device; and wherein the client device determines the set of one or more differences by:

determining a first available duration time from duration data in a first playlist;

determining a second available duration time from duration data in a second playlist;

calculating a first difference between the first and the second available duration times to derive a measure of the difference between the server rate and the client rate.

* * * * *

UNITED STATES PATENT AND TRADEMARK OFFICE
CERTIFICATE OF CORRECTION

PATENT NO. : 11,178,202 B2  
APPLICATION NO. : 16/819816  
DATED : November 16, 2021  
INVENTOR(S) : Nandakumar et al.

Page 1 of 1

It is certified that error appears in the above-identified patent and that said Letters Patent is hereby corrected as shown below:

In the Claims

Column 13  
Line 50, delete "as claim 1" and insert --as in claim 1--.

Column 15  
Line 38, delete "as claim 12" and insert --as in claim 12--.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*